United States Patent [19]

Lalvani

[11] Patent Number: 5,155,951
[45] Date of Patent: Oct. 20, 1992

[54] BUILDING SYSTEMS USING SADDLE POLYGONS AND SADDLE ZONOHEDRA BASED ON POLYHEDRAL STARS

[76] Inventor: Haresh Lalvani, 164 Bank St., Apt. 2B, New York, N.Y. 10014

[21] Appl. No.: 711,451

[22] Filed: Jun. 6, 1991

Related U.S. Application Data

[60] Division of Ser. No. 428,018, Oct. 26, 1989, Pat. No. 5,036,635, which is a continuation of Ser. No. 319,861, Mar. 6, 1989, abandoned, which is a continuation of Ser. No. 88,308, Aug. 24, 1987, abandoned.

[51] Int. Cl.$^5$ .............................................. E04B 1/32
[52] U.S. Cl. .................................. 52/80; 52/DIG. 10
[58] Field of Search ............... 52/79.1, 80, 81, DIG. 10

[56] References Cited

U.S. PATENT DOCUMENTS

| | | | |
|---|---|---|---|
| D. 237,003 | 9/1975 | Jahandideh | 52/DIG. 10 |
| 3,369,727 | 2/1968 | Wright | 52/DIG. 10 |
| 3,568,381 | 3/1971 | Hale | 52/DIG. 10 |
| 3,600,825 | 8/1971 | Pearce | 35/18 A |
| 3,925,941 | 12/1975 | Pearce | 52/82 |
| 3,931,697 | 1/1976 | Pearce | 52/80 |
| 4,133,152 | 1/1979 | Penrose | 52/105 |
| 4,446,666 | 5/1984 | Gilman | 52/648 |
| 4,620,998 | 11/1986 | Lalvani | 428/33 |
| 4,686,800 | 8/1987 | McCormick | 52/81 |

OTHER PUBLICATIONS

Structure in Nature is a Strategy for Design by P. Pearce ©1978 pp. 86–127, 224–226.

*Primary Examiner*—Henry E. Raduazo

[57] ABSTRACT

A building system composed of space-filling saddle zonohedra which fit together periodically and non-periodically into a variety of orderly and irregular looking space structures. The saddle zonohedra are composed of convex or non-convex saddle polygons and are derived from the infinite class of plane-faced zonohedra. The surfaces of the saddle polygons could be continuously curved surfaces or faceted polygonal surfaces derived from minimal surfaces. The surved surfaces could be flexible membranes or nets in tension used by themselves or in combination with space frames, or stiff shell-like surfaces, and the edges of the space frames could be hinged or fixed to others. Applications of the system include architectural and environmental structures, fixed or retractible space frames, decks or platforms, educational kits or toys, curved tiles, and saddle polyhedra nodes for space frames. The building system could be used in extra-terrestrial environments where saddle-shaped "floors", surfaces and enclosures provide interesting possibilities.

33 Claims, 14 Drawing Sheets

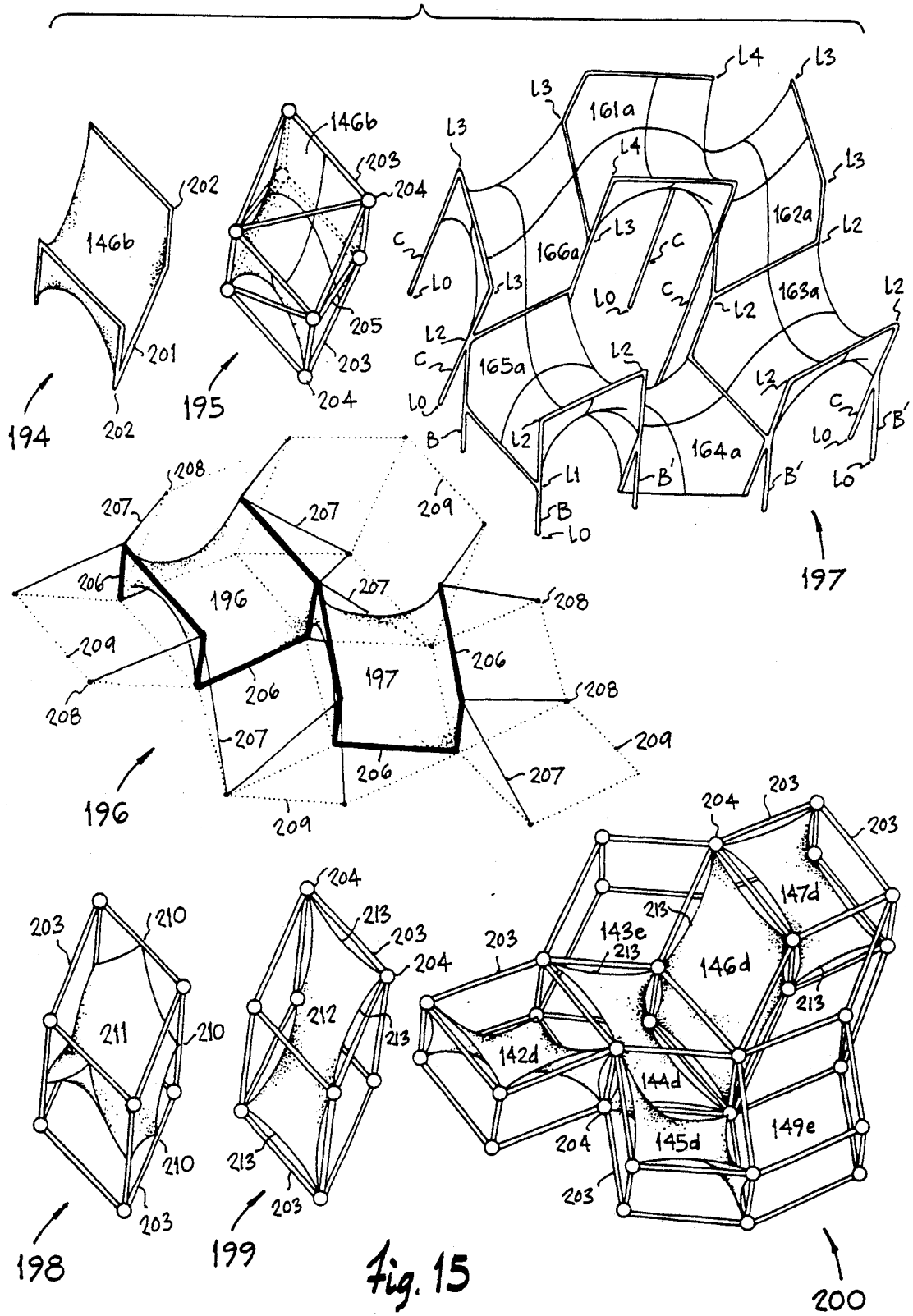

BUILDING SYSTEMS USING SADDLE POLYGONS AND SADDLE ZONOHEDRA BASED ON POLYHEDRAL STARS

This application is a division of the application Ser. No. 07/428,018, filed Oct. 26, 1989, and now U.S. Pat. No. 5,036,635 which is a continuation of application Ser. No. 07/319,861, filed Mar. 6, 1989, and now abandoned which is a continuation of the application Ser. No. 07/088,308, filed Aug. 24, 1987 and now abandoned.

FIELD OF INVENTION

The invention relates to building systems for terrestrial and space architecture. More specifically the invention relates to periodic and non-periodic building systems using saddle polygons and saddle zonohedra derived from polyhedral stars. The saddle structures are used as tensile or shell-like surfaces which can be integrated with space frames.

INTRODUCTION AND PRIOR ART

The architectural environment has been, and it still is, dominated by plane surfaces and straight lines. These fall within the realm of Euclidean geometry. Plane curves, as in arches, and curved surfaces in valuted ceilings and domes, have been known for centuries and provide a necessary counterpoint to the rectilinear spaces. The domed surface, which is generally a sphere, is an example of a non-Eulcidean surface since the sum of the angles of a triangle on this surface is greater than 180°, while in plane geometry this sum is 180°. Such surface has a positive curvature while the plane has zero curvature. There is another class of surfaces which has a negative curvature and where the sum of the angles of a triangle is less than 180° . An example is the well-known hyperbolic paraboliod or hypar, or the hyperboloid of the nuclear power plants, for the pseudo-sphere. Non-Euclidean geometries were formalized in the last century and the names Lobachevsky, Bolyai, Gauss, and Reimann are associated with it. The spherical and the hyperbolic surfaces are doubly-curved. However, the two surfaces are different if we visualize them as being generated by two curves moving over one another. In spherical and ellipsoidal surfaces, the two generating curves are curved in the same way, while in the hyperbolic surfaces, the two curves are curved in opposite directions. The former as termed "synclastic", and the latter "anti-clastic", and both are curved space structures.

Though synclastic surfaces have been more commonly used in architecture, the use of anti-clastic surfaces has been increasingly seen only in the part three or four decades. The Catalan architect, Antonio Gaudi, first recognized its inherent structural potential as a "naturally" stiff or stronger surface, and his later work in the twenties molded the surfaces of stone into series of four-sided hyperbolic paraboloids in irregular compositions or linearly periodic arrays. Felix Candela, in Mexico in the fifties, used "hypars" (from hyperbolic paraboloids) as thin shell concrete structures in arrays of squares and a regular undulated octagon. Frei Otto in Germany, also in the fifties, used the minimal surface notion to develop his membrane structures. His studies with tensile fabric used single even-sided regular polygons with zig-zag edges in tension. Michael Burt in Israel, and Peter Pearce in the U.S., independently showed a systematic study of periodic saddle structures based on symmetry. Burt's saddle polyhedra, and their space-fillings are derived from regular and semi-regular polyhedra and their space-fillings, and have equal edges. Pearce's saddle polyhedra and their space-fillings are based on the cubic symmetry of his universal node system and use three lengths of edges. In marked contrast to these, some of Frei Otto's tent structures are non-modular are use irregular plane geometries to achieve architectural flexibility, an idea which is desirable in architecture. The first example of a doubly-curved shell structure based on the one-sided Mobuius surface was suggested by the Italian architect, Vittorio Giorgini.

In addition to the saddle polyhedra mentioned above, a new class of continuous period minimal surface were independently reported by Alan Schoen, Michael Burt and Peter Pearce. These are continuous saddle surfaces without self-intersections that divide space into two congruent or complementary spaces. The first example of a curved space labyrinth was discovered by Schwartz. A four-dimensional Schwartz surface was developed by David Brisson. A few additional curved labyrinths based on packings of Platonic and Archimedean polyhedra were discovered by Lalvani. The plane-faced and straight-edge structures related to these were reported jointly by Burt, Wachman and Kleinmann and are based on packings of regular and semi-regular polyhedra. These are composed only of regular polygons and are termed "infinite polyhdera". the known curved space labyrinths are based on the high degree of symmetry of periodic space networks from which they are derived and correspond to prismatic, tetrahedral and cubic symmetries where the prismatic symmetries correspond to the space-fittings of regular prisms, and the other two are based on the tetrahedron and the cube, respectively.

Prior art in curved space structures has two basic directions. The first using the non-modular, custom-tailored approach where the parts of a structure are shaped in response to architectural, functional, structural or aesthetic needs, which neccessitate an inherent flexibility in shaping spaces and where irregular planes, even in rectilinear buildings, are a result. In contrast to their, the thrust of industrialization in building has led to the notion of using mass-produced indentical parts for a built-in economy of design, production, construction, etc. This had led to the use of periodic structures based on symmetry. In the latter again, there are two approaches —one based on regular structures having equal edges and equal angles, as in the case of Burt, and the other developing a "unified" building system using at least three types of edges (lengths) but permitting recombinations of the same parts into a large variety of configurations as in the case of Pearce. Clearly, the latter approach is successful in providing a "flexible" system, and hence a flexiblity in the configurations it produces. Both approaches, clearly exploiting the advantages of periodicity to a great extent, have built-in restrictions. Periodicity is forced on the spaces generated, the spaces have "predetermined" proportions based on the symmetry from which they are derived, and many of the spaces have the regularity imposed by spherical or prismatic point groups of symmetry. Clearly, some of the properties may be advantageous in some situations and the experience of a sense of order and beauty that symmetry brings is desirable. But all periodic building systems reinforce the advantages of periodicity and deny irregular planes, or departures in directions of space here and there, and other such devices a designer finds useful. The repetitive nature of periodic structures often removes the element of surprise and intrigue in architecture, resulting in a loss of visual and experiential interest by users and observers.

The art of building would be furthered if all the advantages of periodicity were retained, and yet the irregularity was made possible, the proportions and shapes of space were not "dictated" by regular polygons, regular and semi-regular polyhedra, or proportions determined by high symmetry groups. The present disclosure is aimed in this direction. It uses modularity—one length of edge only as one possibility—excludes the use of regular polygons, permits infinite families of structures, permits periodic arrangements, and most important of all, it makes non-periodic, random-looking arrangements possible out of the same modules. The modules are based on minimal surface or its deformations and use a variety of saddle shaped components. A modular system that permits non-periodic curved space structures is not mentioned in the prior art, and a system that permits both periodic and non-periodic arrangements out of the same curved modules is also not mentioned in prior art. More specifically, the present invention described the derivation of saddle polygons and saddle polyhedra based on zonohedra and parallelopipeds.

U.S. Pat. No. 4,133,152 to Roger Penrose is cited for disclosing a non-periodic plane tiling based on pentagonal symmetry. U.S. Pat. No. 4,620,998 to H. Lalvani is cited for disclosing periodic and non-periodic plane tilings using crescent-shaped polygons. U.S. Pat. No. 3,931,697 to P. Pearce discloses periodic saddle configurations based on regular-faced polyhedra of cubic symmetry. U.S. Pat. No. 4,584,800 to M. Burt and E. Kent discloses a tension surface based on a periodic array of saddle hexagons. U.S. Pat. No. 3,663,346 to A. H. Schoen discloses periodic honeycomb structures based on cubic and prismatic symmetries. U.S. Pat. No. 3,970,301 to C. R. Lehmann discloses three-dimensional tensile nets based on periodic symmetries obtained from pachings of regular-faced polyhedra and prisms. U.S. Pat. No. 4,492,723 to L. S. Chadwick discloses polyhedral construction kits with curved faces and curved edges. U.S. Pat. No. 4,651,479 discloses four-sided hypars in a periodic hexagonal array. The French patent 2,453,5957 to C. Iconomou discloses four- and six-sided hypars as warped panel structures. The paper 'Saddle Polyhedra' by Michael Burt, published in Zodiac 21, Olivetti Co., Italy (1973) and Peter Pearce's structures from his book 'Structure in Nature is a Strategy for Design', MIT press (1978), are also cited as prior work.

SUMMARY OF THE INVENTION

The term 'zonohedra' is used here to describe 'plane-faced' zonohedra, i.e. a class of known polyhedra with even-sided plane polygonal faces arranged in pairs of opposite and parallel faces. The faces of zonohedra are parallelograms and zonogons, where zonogons are even-sided polygons with pairs of opposite and parallel edges. The term 'saddle zonohedra' will be used for polyhedra composed of saddle polygons and derived from zonohedra by the method described herein.

This application discloses the derivation saddle zonohedra from 'polyhedral' n-stars (or n-vector stars), where n-star is a star of n non-collinear vectors radiating from a point. Polyhedral n-starts described here are obtained by joining the vertices of any polyhedron to its center. From each n-star, a class of sub-stars termed p-stars, where p is any number greater than two and less than or equal to n, is also used to derive zonohedral and saddle zonohedral structures. Three classes of polyhedral n-stars used in this invention are determined by:

i) an n-star with equal vectors based on an arbitrary or irregular polyhedron having a vertices lying on a sphere, with n greater than three;

ii) an n-star with equal vectors based on a regular or semi-regular polyhedron, polyhedral duals, and stars based on subdivisions of polyhedra, with 2 n vertices where n is greater than four;

iii) an n-star with unequal vectors based on an arbitrary or irregular, convex or non-convex polyhedron with n greater than 3.

The three classes of n-stars are hierarchical in their regularity. The stars based on regular or semi-regular polyhedra and the most ordered. The stars based on arbitrary spherical polyhedra have lost the regularity of angles. The stars based on arbitrary convex or non-convex polyhedra have lost the regularity of both lengths and angles. This class of n-stars further removes the restrictions of regularity already greatly reduced by the previous class. This produces modular saddle structures with unequal edges and arbitrary angles, and is the further from regular structures. Even when such regular or semi-regular stars are used as a starting point, as in the second class of polyhedral stars based on symmetric polyhedra, the end result is not regular at all, as any arbitrary composite of convex and non-convex saddle polygons within one saddle zonohedron can be derived.

In the present application, a large class of saddlle polyhedra with convex and non-convex saddle polygonal faces is disclosed. Sometimes, saddle faces are combined with plane faces. The space-fillings of these saddle polyhedra are also disclosed. These space-fittings are periodic or non-periodic. In the non-periodic cases, highly irregular looking configurations are possible. A special class of non-periodic structures which are periodic in one direction and non-periodic in another are also disclosed. Curved space labyrinths based on a saddle variant of a truncated octahedron are also disclosed. Saddle polyhgons defined by the edges of non-periodic space-fillings or parallelopipeds or rhombohedra are also disclosed. The saddle polyhedra described herein can used as tensile structures by themselves, or in combination with space frames, or as shell-like surface structures. Though only selected examples are shown as embodiments of the invention, numerous variants can be derived without departing from the scope of the invention as described herein and appended by the attached drawings.

DRAWINGS

Referring now to the drawings which form a part of this disclosure:

Figure 9:
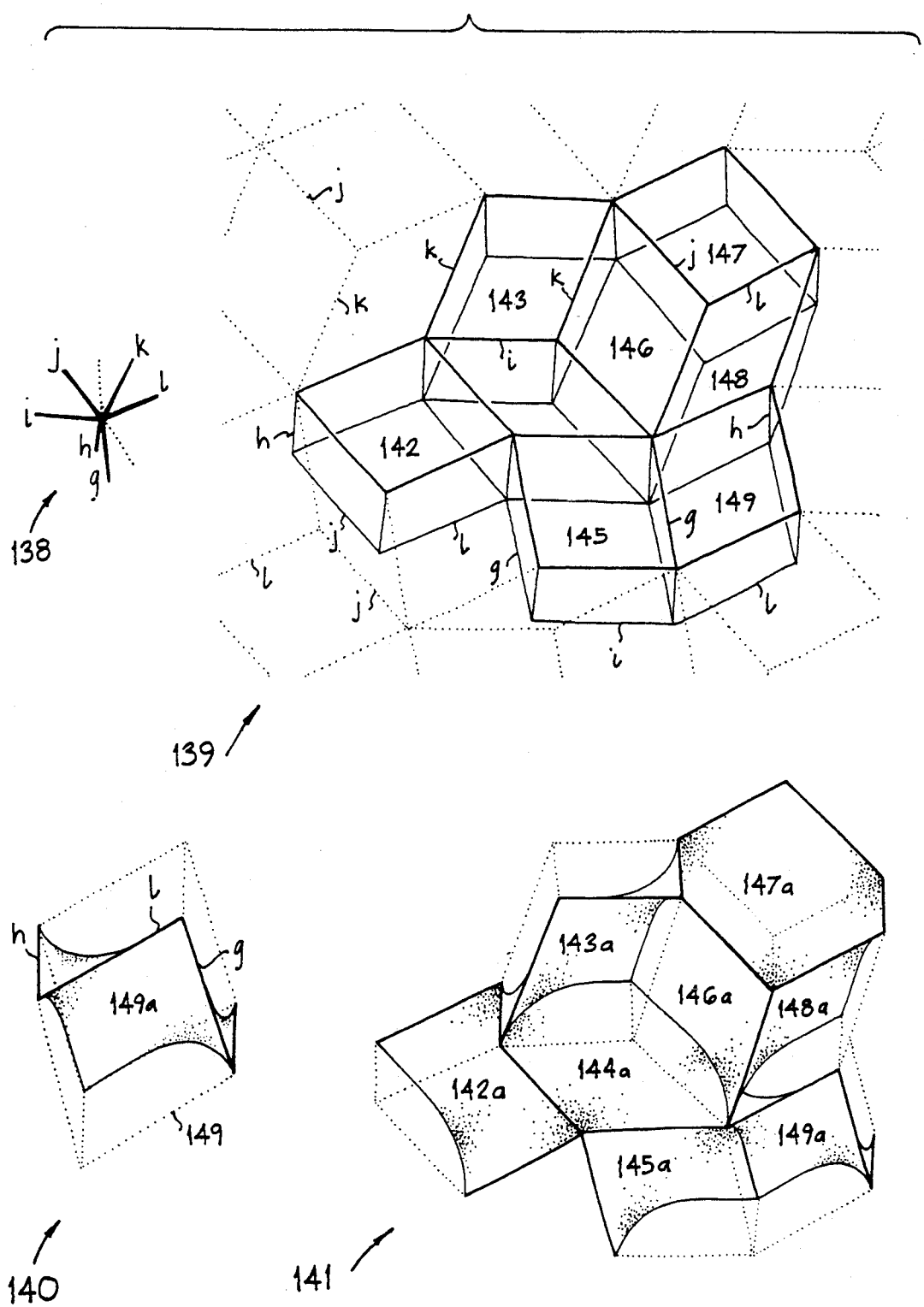
FIG. 9 shows a portion of a non-layered non-periodic space lattice composed of inclined parallelopipeds or rhombohera, and an associated saddle of surface composed of saddle hexagons based on a 6-star.
Figure 10:
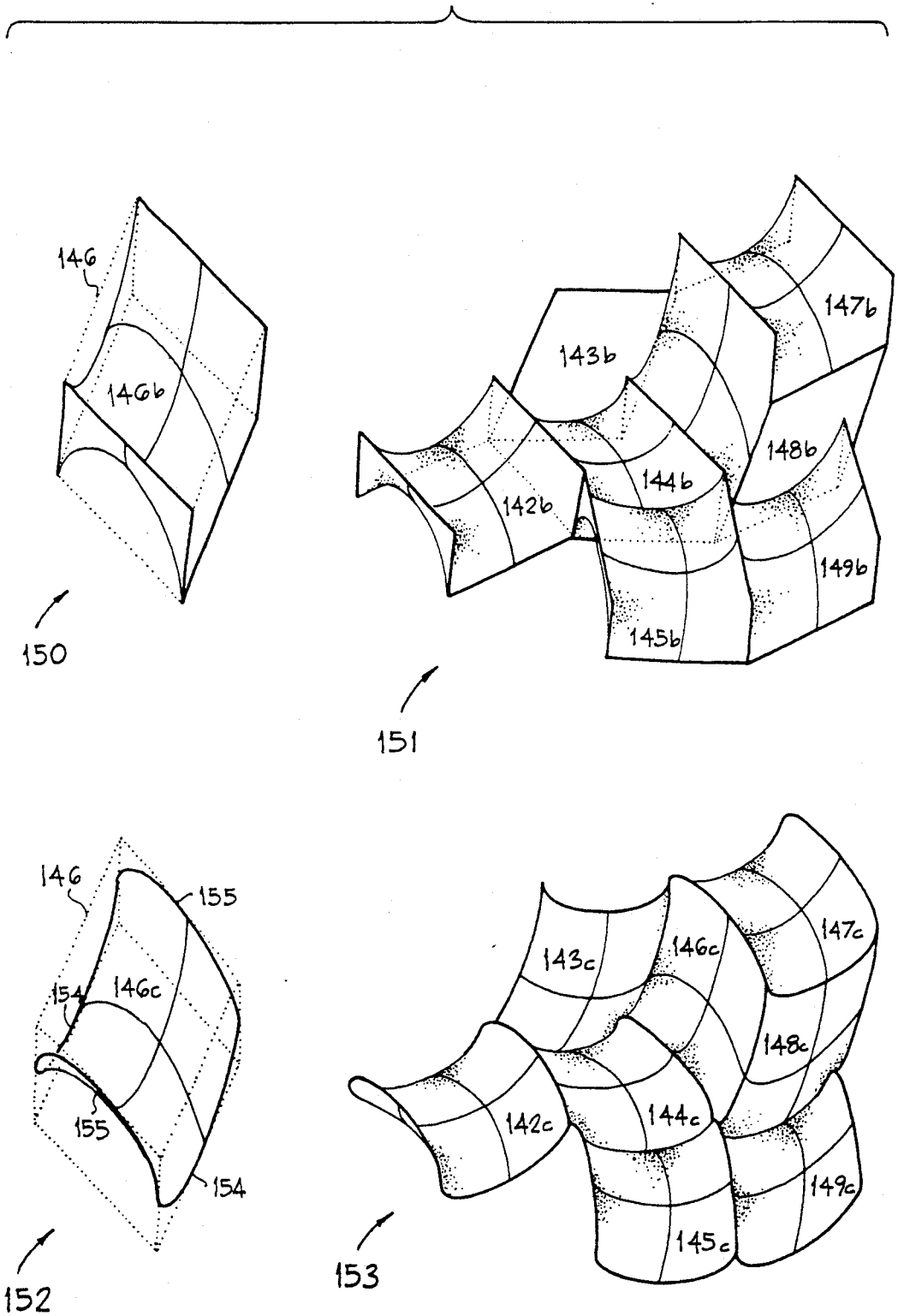

FIG. 10 shows two other examples based on the non-periodic lattice of FIG. 9. The configuration on top uses octagonal saddles inscribed within parallelopipeds. The configuration below is a curved varaint of the one above.

Figure 11:
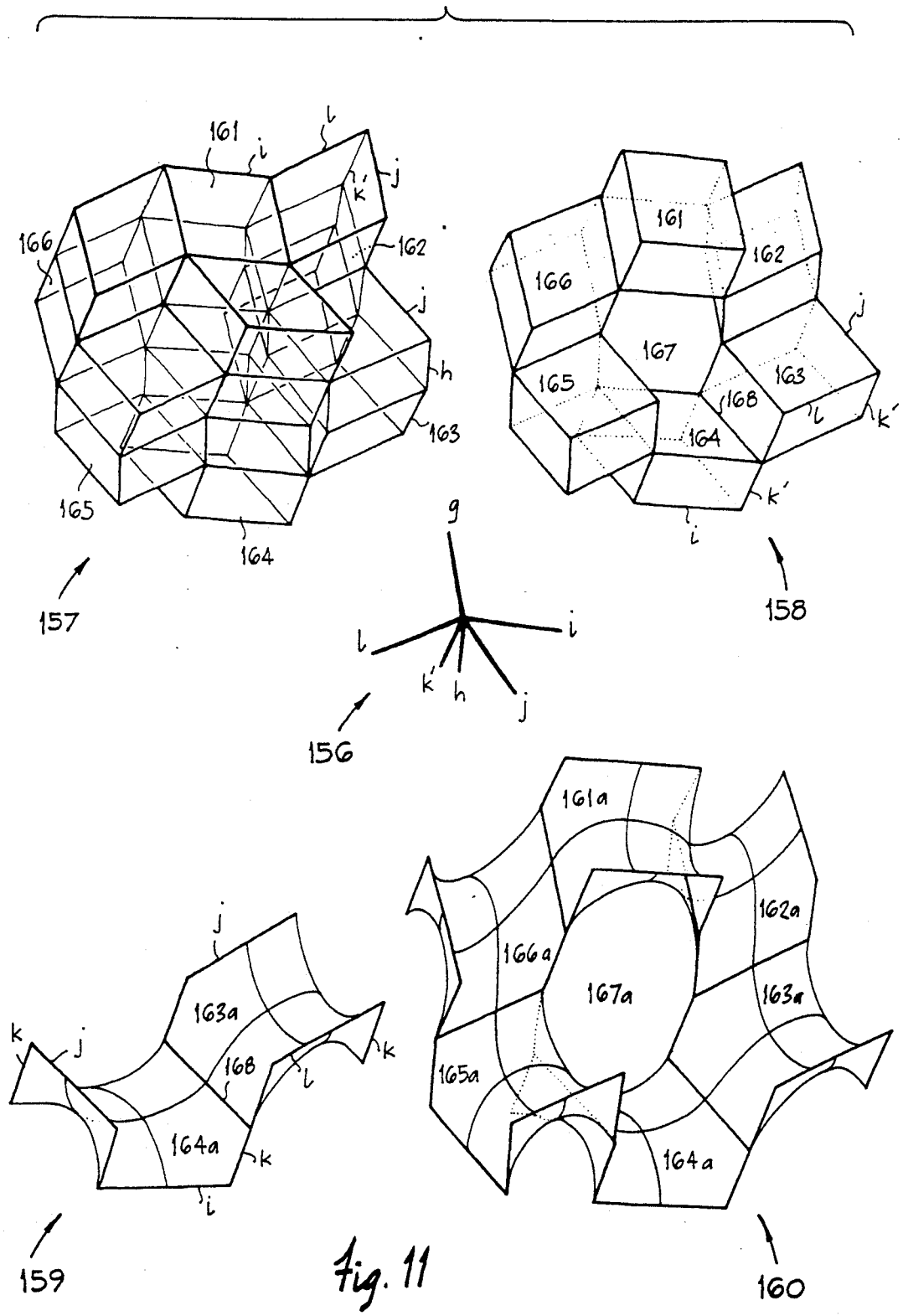

FIG. 11 shows a portion of a non-periodic lattice based on a slight variant of 6-star of FIG. 9. A special non-regular continuous curved surface with a "hole" is derived from edge-to-edge connected parallelopipeds (or rhomboherda) and is composed of octagonal saddles.

Figure 12:
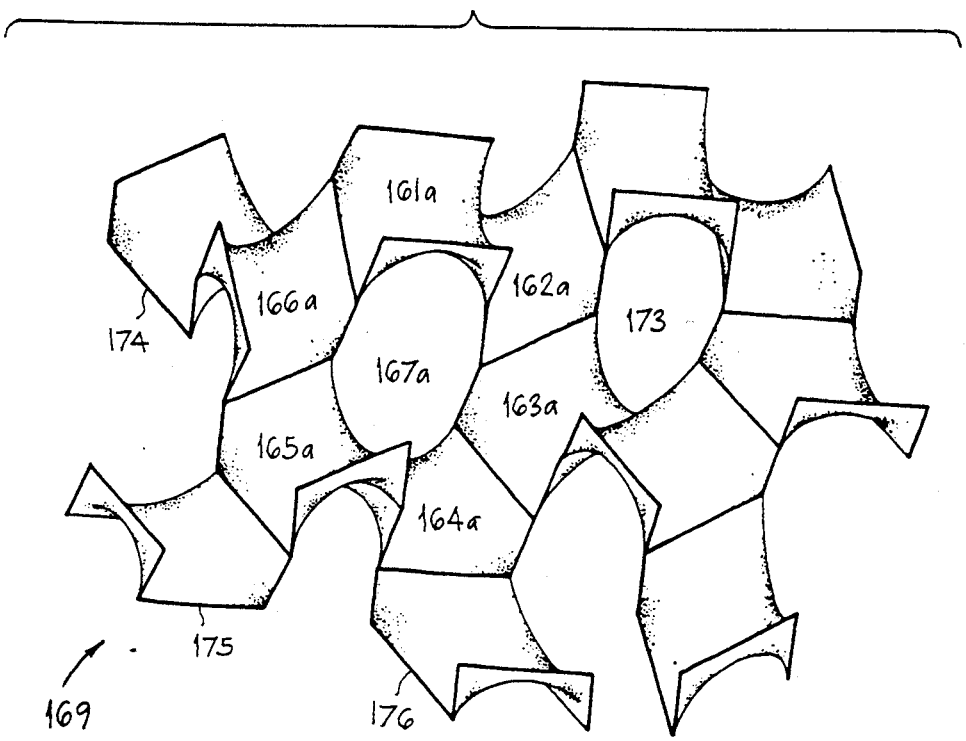
Figure 12:
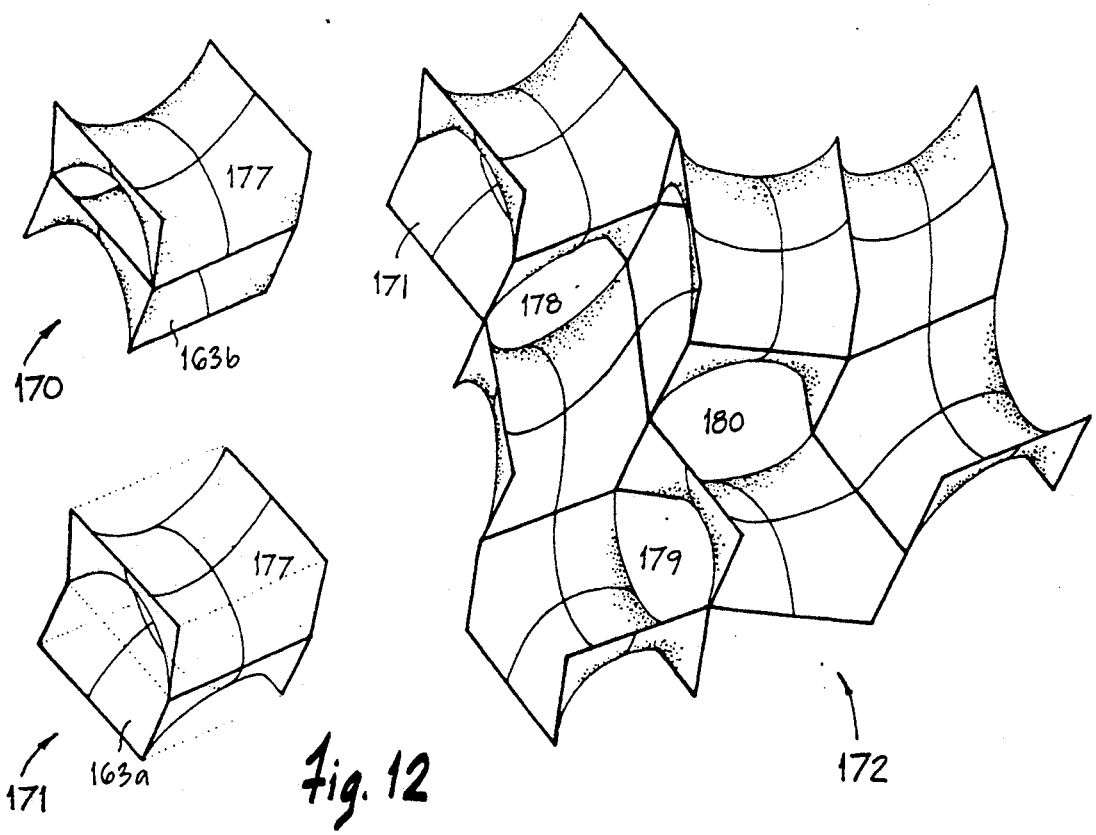

FIG. 12 shows an extension of the continuous curved surface of FIG. 11. Poosibilities for stacking saddle modules is also shown.

Figure 13:
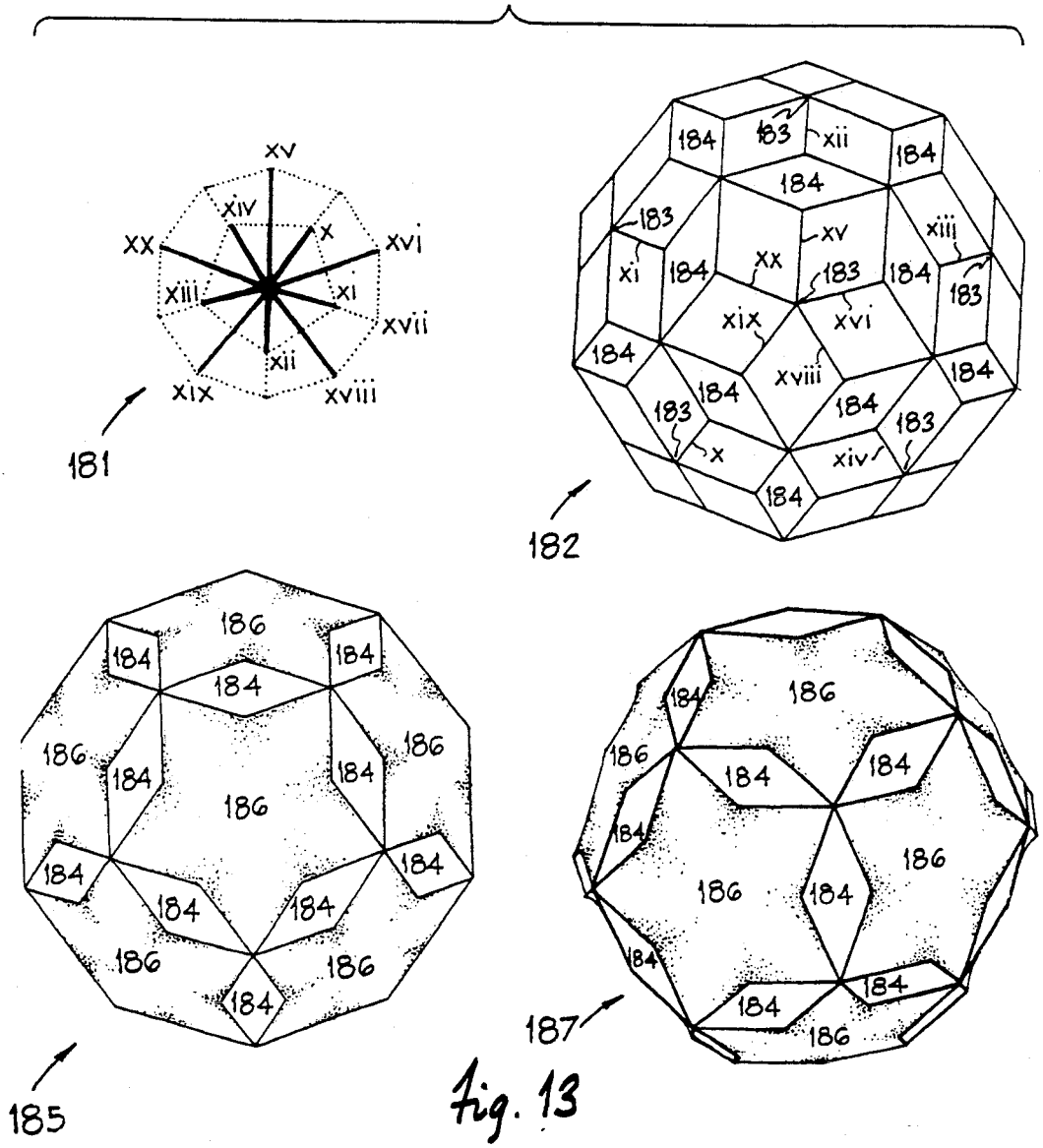

FIG. 13 shown one example of a centrally or spherically symmetric saddle zonohedron of icosahedral symmetry based on a 10-star obtained from a regular dodecahedron.

Figure 14:
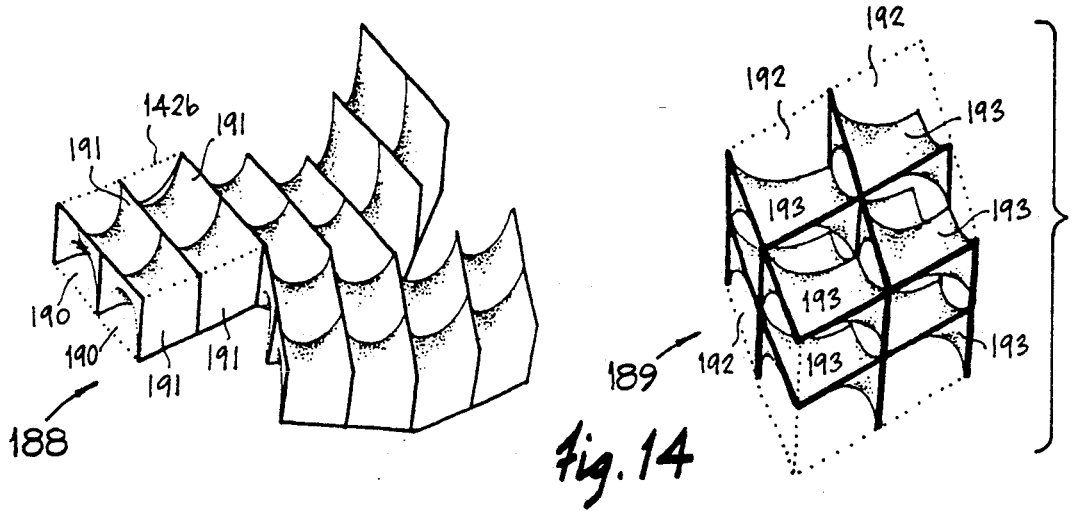

FIG. 14 shows the decomposition of an inclined parallelopiped into smaller inclined parallelopipeds as a basis for periodic sub-arrays of saddle polygons within periodic, non-periodic or centrally symmetric arrays.

FIG. 15 shows some candidate concepts for the integration of structural system with the geometry of saddle polyhedra shown in the previous figures. Examples of rigid frames, hinged space frames, tensile membranes, use of cables, and the application of a multi-level, non-planar, layered frame configuration to a "horizontal surface" is also shown.

DETAILED DESCRIPTION OF THE INVENTION

Figure 1:
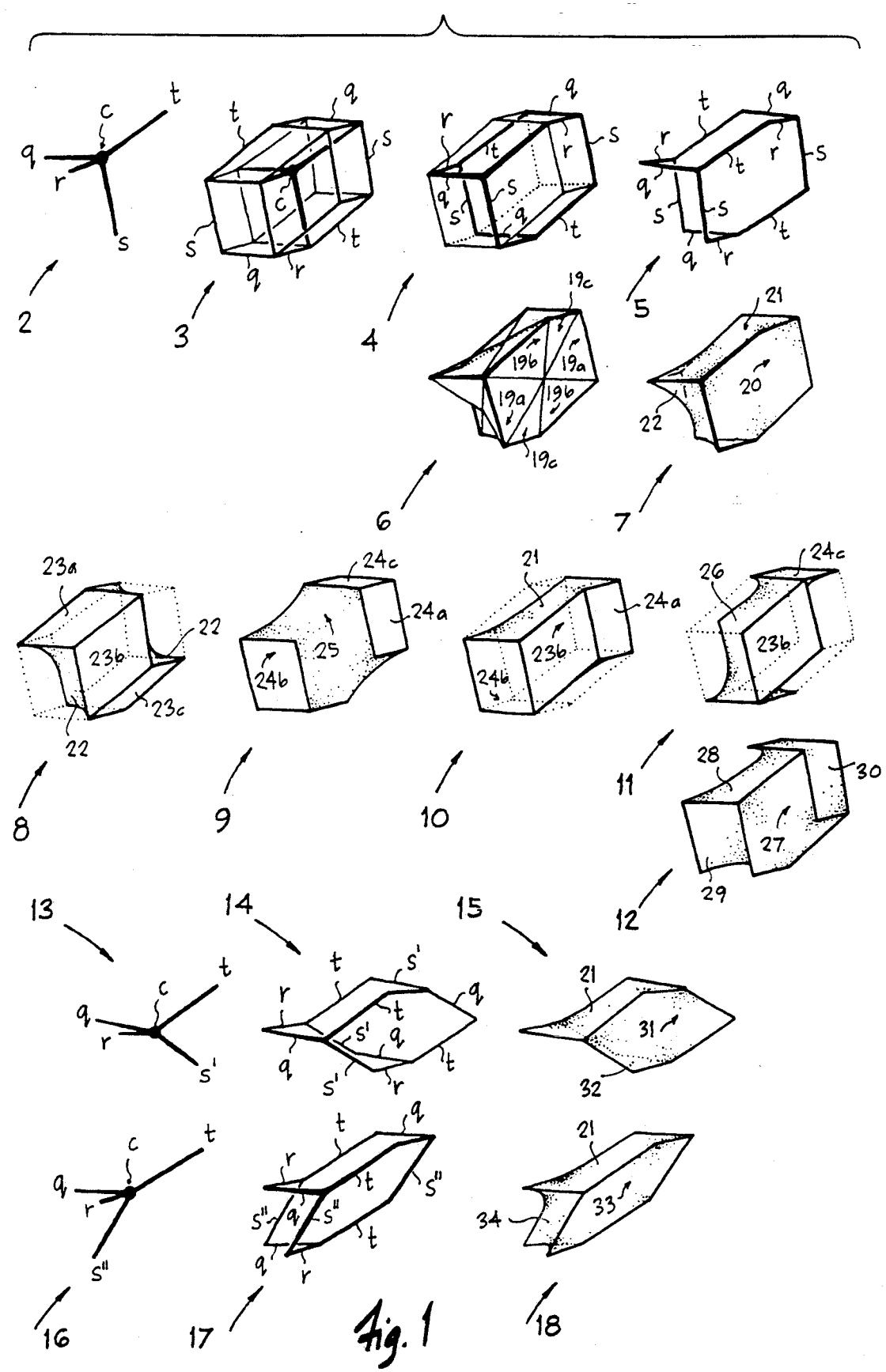
FIG. 1 shows the derivation of various saddle polyhedra from a 4-vector star (p=4). Included are saddle tetrahedra composed of four saddle hexagons, and others which use a combination of plane and saddle polygons.

In FIG. 1, 2 is a 4-star or 4-vector star (i.e., n=4 case) based on an arbitrary tetrahedron and having 4 vectors q, r, s and t. The four vectors may or may not be equal in length, and the angles between these vectors are unequal. The tetrahedron can be visualized by joining the four outer ends of the four vectors to one another such that C is its center. When the vectors are equal, the vertices of the tetrahedron lie on a sphere. The 4-star 2 produces the zonohedron 3, shown here with the 4-star in its interior which subdivides the zonohedron into four rhombohedra. In 4, the zonohedral shell is shown. Its edges are equal and parallel to the corresponding vector directions as marked. This particular zonohedron is a deformed rhombic dodecahedron, where the undeformed one is a well-known Archimedean dual polyhedron. The three rhombii surrounding each of its four tri-valent vertices can be replaced by four saddle hexagons, where each saddle hexagon is the zig-zag "girth' polygon of each rhombohedron. This is shown by heavy lines in 4 and is shown separately in 5. The skeletal configuration 5 can act as the edges of a non-convex polyhedron as shown in 6 and 7. This non-convex polyhedron is irregular saddle tetrahedron in both cases and is composed of 4 saddle-shaped hexagons. In 6, each saddle hexagon is composed of six planar triangular regions 19a, 19b and 19c as shown. In 7, the saddle hexagon is a familiar smooth minimal surface, characteristic of soap films, and used as a starting point for membrane structures. In practice, the minimal surfaces are deformed due to gravity. However, in the zero-gravity envirnments of space, true minimal surfaces can be achieved 8-12 are various examples of saddle polyhedra obtained from 4 by replacing a set of even number of contiguous edges of the zonohedron with a saddle polygon. Examples 8-11 combine plane rhombic or paralellogram faces with saddles. 8 and 10 are non-regular zig-zag hexagonal prisms with saddle hexagonal tops and bottoms. 9 is a variant on the hyperboloid and is capped by three rhombii 24a, 24b and 24c on either sides. 11 is special variant of an inclined prism with saddles on either sides. 12 has saddles in an irregular composition, with or without plane rhombic faces.

13 and 16 are variants of the 4-star 2. In both variations, the vectors q, r and t are kept unchanged and the vector s has changed to s' and s" respectively. The corresponding skeletal edge configurations 14 and 17 correspond to 5, and the saddle tetrahedra 15 and 18 correspond to 7. In both variants, the saddle hexagon 21 remains unchanged, while the saddle hexagon 20 changes to 31 and 33, and 22 changes to changes to 32 and 34, respectively. These two variants suggest that other variations in the angles and lengths of vectors would produce variable geometries of saddle tetrahedra. All four vectors can be changed in an infinite variety of combinations, liberating the restriction of regularity with predetermined angles to any desired proportion of space or structure. For each 4-star, there are thus infinite positions, and hence an infinite variety of saddle structures can be produced for n=4 case.

Figure 2:
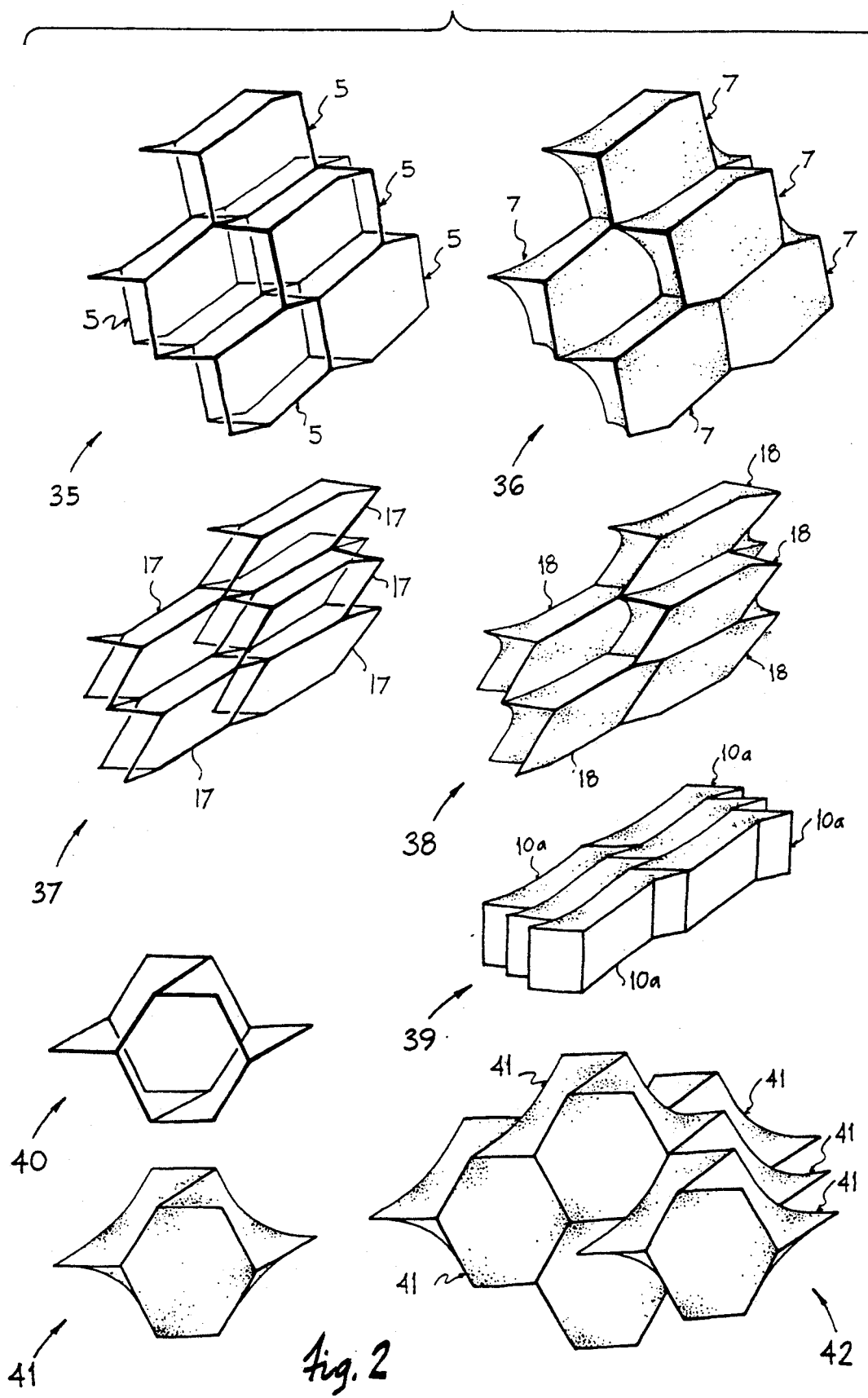
FIG. 2 shows periodic space-fillings of various saddle polyhedra of FIG. 1 including saddle tetrahedra, a hexagonal prism with saddle top and bottom, and a saddle hexahedron. Periodic but sheared variants of the diamond lattice as are also shown.

FIG. 2 shows periodic space-fillings of saddle polyhedra based on n=4 case. 35 and 37 are titled or skewed variants of the diamond lattice. The lattice 35 is composed of wire-frame cells 5, and the lattice 37 is composed of cells 17. The corresponding periodic space-fillings of saddle tetrahedra are shown in 36 and 38, respectively. 36 is composed of saddle tetrahedra 7 and 38 is composed of 18. 39 is a periodic space-filling of zig-zag hexagonal prisms 10a which are variants of 10. 40 is a skeletal saddle hexahedron and a 4-star and is composed of six saddle hexagons. The corresponding saddle hexahedron 41 is a space-filling module as shown in the periodic array 42.

Figure 3:
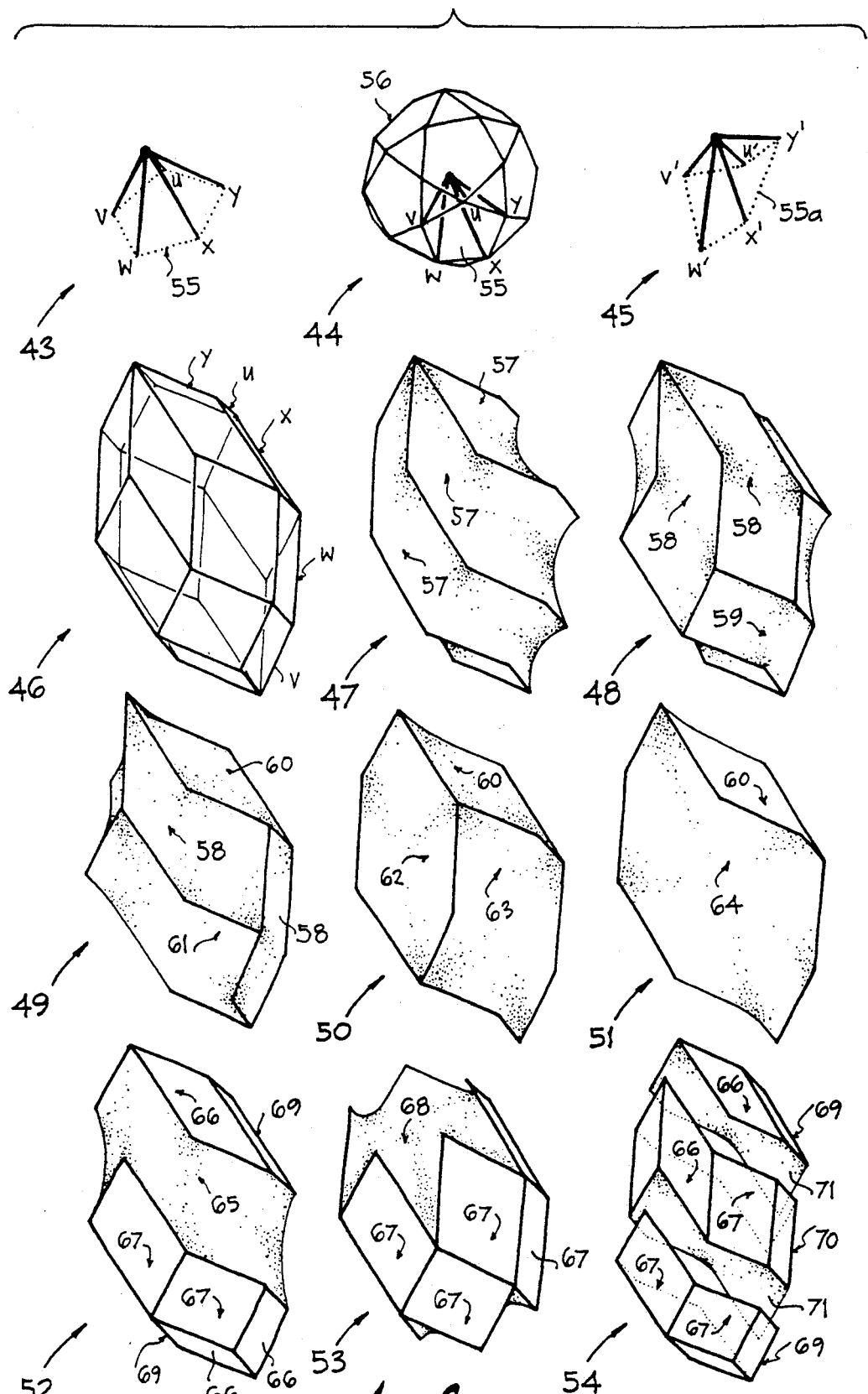
FIG. 3 shows miscellaneous saddle polyhedra from a 5-vector star (p=5,n=15) obtained from a semi-regular polyhedron.

FIG. 3 shows various saddle polyhedra produced from a 5-star. This particular example is based on one example taken from the family of n-stars derived from any regular or semi-regular polyhedron. Since all the vertices of these polyhedra lie on the same sphere, this class of polyhedral stars are special cases of the one mentioned above. From an n-star, any p-star (where p is less than or equal to n) can be derived. When p=n, the zonohedron retains the spherical symmetry of the parent polyhedron from which the p-star is derived. But values of p less than n are less regular, though a few still retain some sub-symmetry. The present disclosure uses these zonohedra as an intermediary step to derive saddle polyhedra.

One example of p=5 from n=15, based on the star derived from icosidodecahedron, a well-known Archimedean polyhedron composed of alternating pentagons and triangles, is shown in 43 and 44. The five vectors u, v, w, x and y in 43 correspond to one pentagonal face 55 of the icosidodecahedron 56 shown in illustration 44. The five vectors produce the zonohedron 46 with twenty rhombic faces, with edge directions as indicated by five outer edges, and where all other edges are parallel and equal to these five edges. Variants can be derived by suitably changing the lengths and/or angles of the 5-star. An example is shown in 45 where the vectors have been changed to u', v', w', x' and y' and the plane pentagon 55 has transformed to a non-planar non-convex pentagon 55a.

The saddle zonohedra 47–51 are derived from 46 by replacing sets of contiguous rhombii by a saddle polygon. The saddle polyhedron 47 has a sinuous strip of rhombii removed and replaced by a non-convex saddle decagon 57. It has five such saddles in a five-fold rotational symmetry along the axis joining the two pointed apices. The saddle polyhedron 48 replaces every pair of adjacent rhombii by two types of non-convex saddle hexagons 58 and 59. It has ten such saddle hexagons. 49 is composed of at least three different saddle polygons. The hexagons 58 and 60 and the octagon 61. 50 is composed of saddle hexagons 60 and 62 and a saddle octagon 63. 51 is composed of saddle hexagon 60 and saddle decagon 64.

Saddle zonohedra 52–54 combine plane rhombic faces with saddles. 52 is related to 9 and has a girth hyperboloid 65 capped by pieces 69, each composed of rhombii 66 and 67. 53 is capped by decagonal saddles 68 on top and bottom and ten rhombic faces in the equitorial region. 54 is a decomposition of the zonohedron 46 by saddle polygons 71 lying on its interior. This particular example has two parallel saddle octagons 71 forming a zig-zag octagonal saddle prism 70 in the middle region. The top and bottom region are caps 69 composed of rhombii 66 and 67 on the outside and the octagon 71 on the inside.

Other saddle polyhedra from this and other p-stars and n-stars can be derived for each regular or semi-regular polyhedron. The present system uses such polyhedra with 2 n vertices with n greater than 4. This excludes three of the regular polyhedra, the tetrahedron, the octahedron and the cube. The remaining two, the icosahedron and the pentagonal dodecahedron, and the 13 Archimedean polyhedra can be used to derive an extremely large variety of saddle polyhedra by the method described. In addition, one polyhedral star can be combined with another by superimposing the two over each other to produce hybrid n-stars from which other saddle zonohedra can be derived. Spherical or polyhedral subdivisions, like the method used for geodesic spheres, lead to other classes of n-stars.

Figure 4:
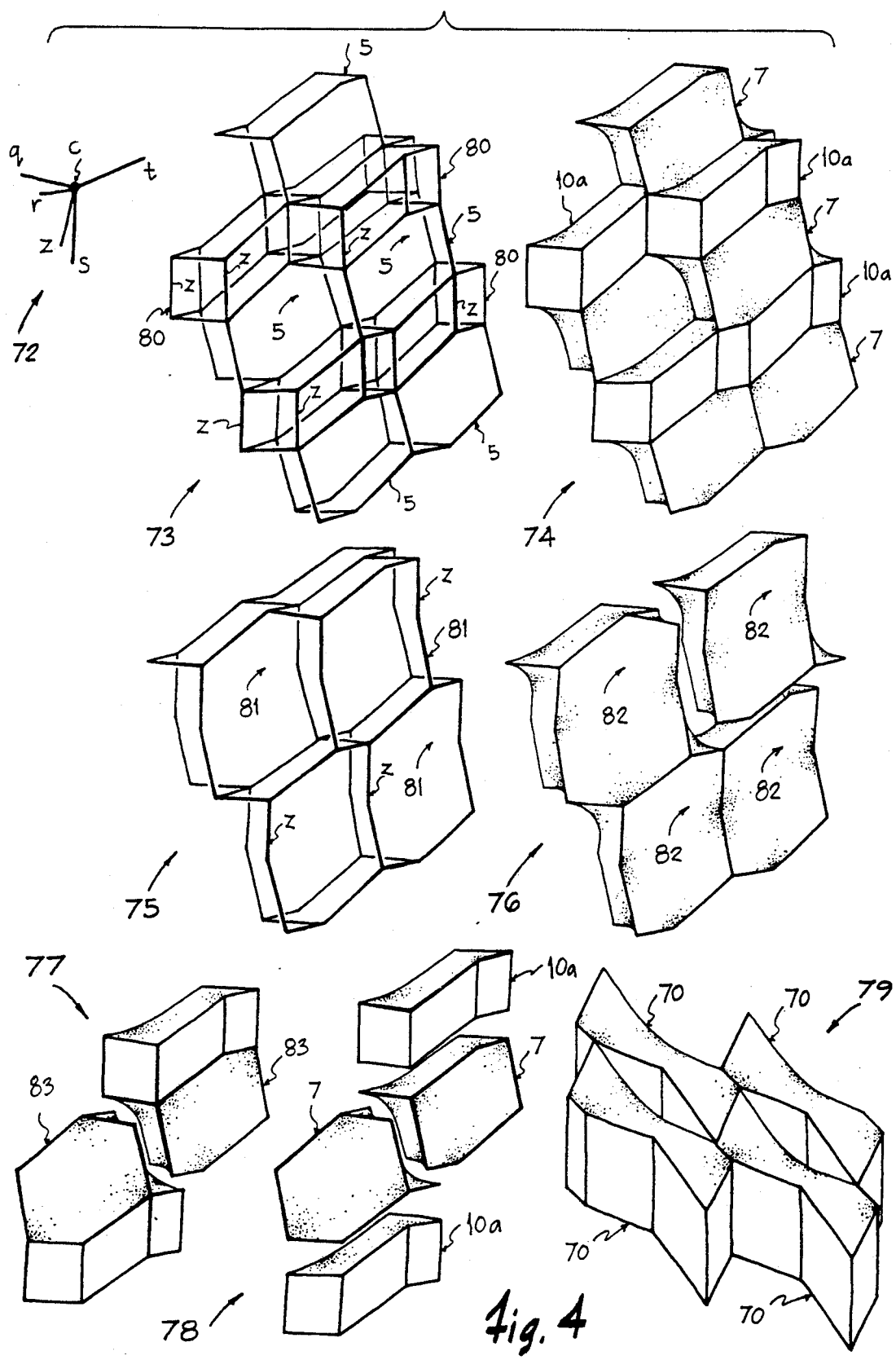
FIG. 4 shows the space-fillings of saddle polyhedra based on 5-stars (n=5).

FIG. 4 shows examples of periodic lattices and associated space-fillings of saddle polyhedra for the n=5 case. The 4-star 2 of FIG. 1 is converted to the 5-star 72 by adding the fifth vector z. The lattice 35 of FIG. 2, which is based on the star 2, thus transforms to the lattice 73 which is based on 72. In 73, skeletal hexagonal prisms 80 are thus added in alternating layers between skeletal saddle tetrahedra 5. Correspondingly, the space-filling 74 comprises the saddle tetrahedra 7 alternating with the zig-zag prisms 10a. The lattice 75 is obtained by removing certain edges from 73 and consists of cells 81 which are composed of three octagons and a hexagon. The associated space-filling 76 is composed of saddle polyhedra 82. 77 and 78 shows two decompositions of the space-filling 74. In 77, the saddle tetrahedron is fused with the zig-zag prism to produce the module 83. In 78, the saddle tetrahedron 7 and the prism 10a are shown as separate modules. 79 illustrates a layer from the periodic space-filling composed of zig-zag octagonal prisms 70 based on the 5-star 43 as shown in FIG. 3.

Figure 5:
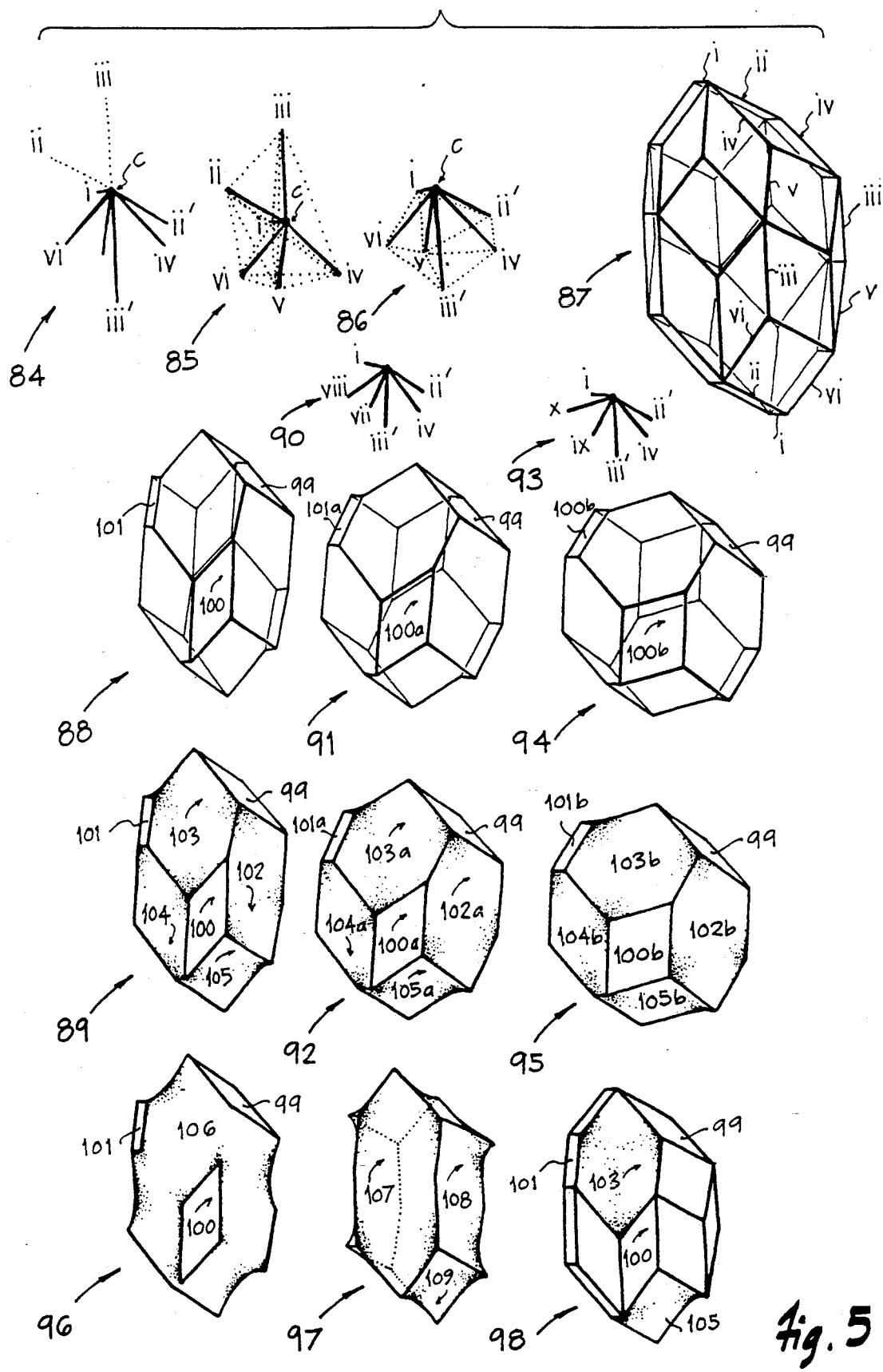
FIG. 5 shows the derivation of saddle polyhedra from a 6-star (n=6). This includes saddle variants of the truncated octahdedron composed of eight saddle hexagons and six parallelograms.

FIG. 5 shows an example based on a 6-star 84 (n=6 case). It is based on six unequal vectors i, ii', iii', iv, v and vi at arbitrary angles. The star 85 is a different representation of the same vector star; here the vectors ii' and iii' are shown on the opposite side of C, and the outer form obtained by joining the outer points of the vectors defines an irregular octahedron. The dotted lines in 85 indicate another way of defining the outer shape of the star; in this particular instance, the dotted lines show five faces of an irregular icosahedron which is obtained when all six vectors are extended beyond the center to the opposite sides and the twelve outer vertices are then joined. The star 84 or 85 generates the zonohedron 87 having 30 rhombic faces, where the six outer edges are identified by corresponding vectors and where other edges are parallel to these six. This zonohedron is an irregular variant of the known Archimedean dual, the rhombic triacontahedron. From this saddle polyhedra can be derived as shown earlier for the n=4 and 5 cases.

One irregular saddle polyhedron 89, sown in its skeletal form in 88, is obtained by selectively replacing eight of the twenty tri-valent vertices of 87 by saddle hexagons 102–105. There are additional four hexagons on the other side in an inverse symmetry, making a total of eight saddle hexagons. In addition, this polyhdron has six plane rhombii, two each of rhombii 99–101. The structure is an irregular saddle variant of the known semi-regular polyhedron, the truncated octahedron, and can be termed a 'saddle truncated octahedron'. Clearly, there would be infinite such arbitrary 6-stars, each producing their own uniquely deformed saddle truncated octahedra. As examples, the variant star 90 produces the skeltal variant 91 and its saddle version 92 corresponding to 88 and 89, respectively, and the star 93 produces 95 and 96. In both stars 90 and 93, vectors i, ii', iii' and iv remain unchanged, and vectors v and vi change to vii and vii in 90 and to ix and x in 93. The rhombic faces 99 remain unchanged while the other faces change.

Saddle structures 96–98 are other examples derived from 87. Structure 96 can be derived from 89 by keeping the rhombii 99–101 unchanged and removing the remaining edges. The resulting structure has one smooth continuous surface 106; this surface can be decomposed into eight hexagons, each with three concave curved edges which alternate with three straight edges. Structure 97 has six faces composed of three pairs of opposite faces, where each face is a saddle octagon. Structure 98 has four saddle faces of which only two, namely 103 and 105 are visible in the view shown. The back side has two additional saddle faces, 102 and 104. The four saddle faces correspond to four of the eight saddles in 89 and their centers define an irregular tetrahedron.

Figure 6A:
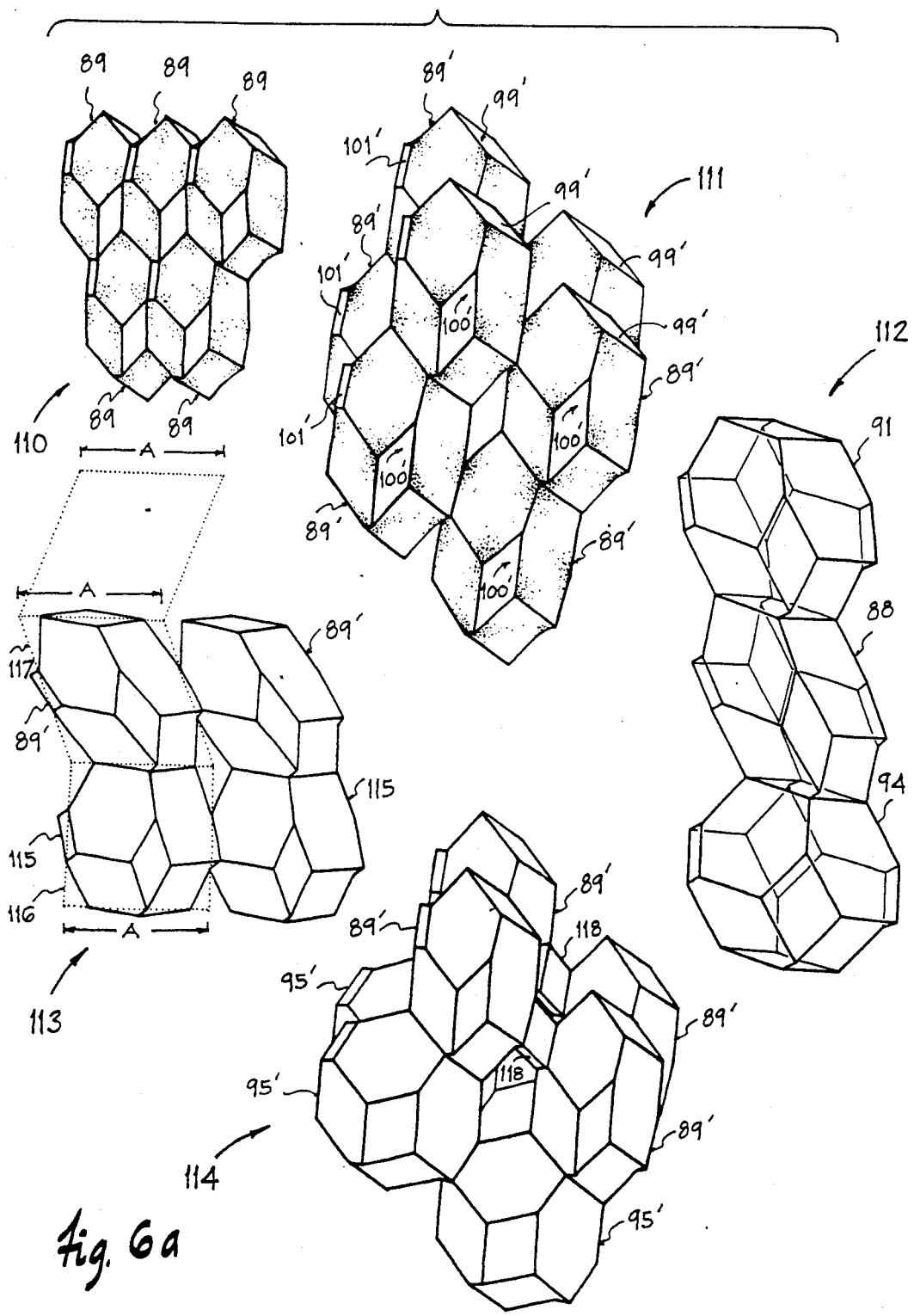
FIGS. 6a and 6b show space-filling of saddle polyhedra of FIG. 5/ Included are examples of a curved space labyrinth as anon-regular variant of the known Schwartz surface. Periodic and non-periodic configurations are suggested.
Figure 6B:
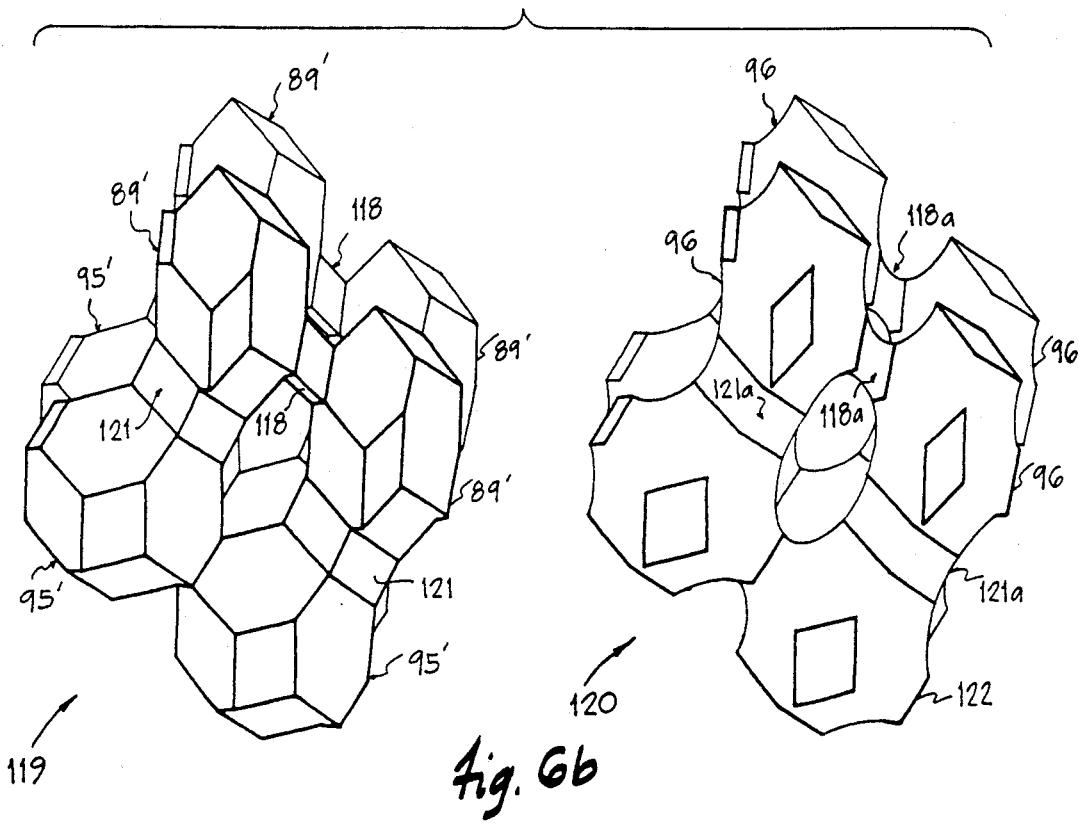

FIGS. 6a and 6b show examples of periodic and non-periodic space-fillings based on the saddle polyhedra of n=6 case shown in FIG. 5. Structure 110 is a periodic space-filling obtained by repeating the module 89, 111 is an interesting variant, where the configuration is treated as a continuous saddle surface such that the interior of one module flows into the next module. This is achieved when the rhombic faces 99', 100' and 101' are "empty" or removed, converting them into holes. The modules 89 are modified to 89' and the configuration produced is a saddle labyrinth that divides space into two congruent but separate parts. By varying the angles and lengths of the vectors, an infinite class of saddle truncated octahedra can be produced, each leading to a labyrinth with a different geometry. 112 shows the possibility of stacking any set of variants in any combination along the vertical or an inclined axis, and the entire set can then be repeated periodically in the horizontal plane. This produces a special class of structures which are periodic in one (or more) direction and non-periodic in the other. For example, if two layers of a lattice or a space-filling are named A and B, then a periodic layer is of the type ABABABAB . . . . . ., and non-periodic layering is of the type AABABBBAABA . . . . . . in 112, the modules 88, 91 and 94 are stacked. When a unit of stacked is repeated periodically, several possibilities arise. These are described next.

The variant modules of the type shown in 112 have varying widths, and if modules on one layer touch their neighbours, this is not guaranteed on the other layers which have different modules. When the widths of the modules are constrained to a fixed size A as shown in 113, where A specifies the width of the parallelogram passing through the middle of the module 89', module 115 in the lower layer has to have the same width A to gaurantee it will touch its neighbours when repeated in its layer. Two or more modules can be similarly stacked, in periodic or non-periodic manner along one direction, and repeated periodically along the other, in 113, when the rhombii are holes, a zig-zag variant of 111 is produced. The configuration 114 shows a portion of a periodic or non-periodic configuration where the modules 89' and 95' (i.e., 95 with rhombic faces removed) do not adjusted widths. The layer containing 95' touches its neighbours in the bottom layer, while the top layer containing the smaller modules 89' require the insertion of rhombic prisms 119 to make the space within adjacent modules continue from one to another.

In FIG. 6a, 114 is transformed to 115 by inserting the prism 120 between the top and bottom layers. Structure 116 is a variant of 115, where the module 96 replaces 89, 121 replaces 119, and 122 replaces 120. The connecting modules 121 and 122 are deformed hyperboloids with rhombic tops and bottoms.

Figure 7:
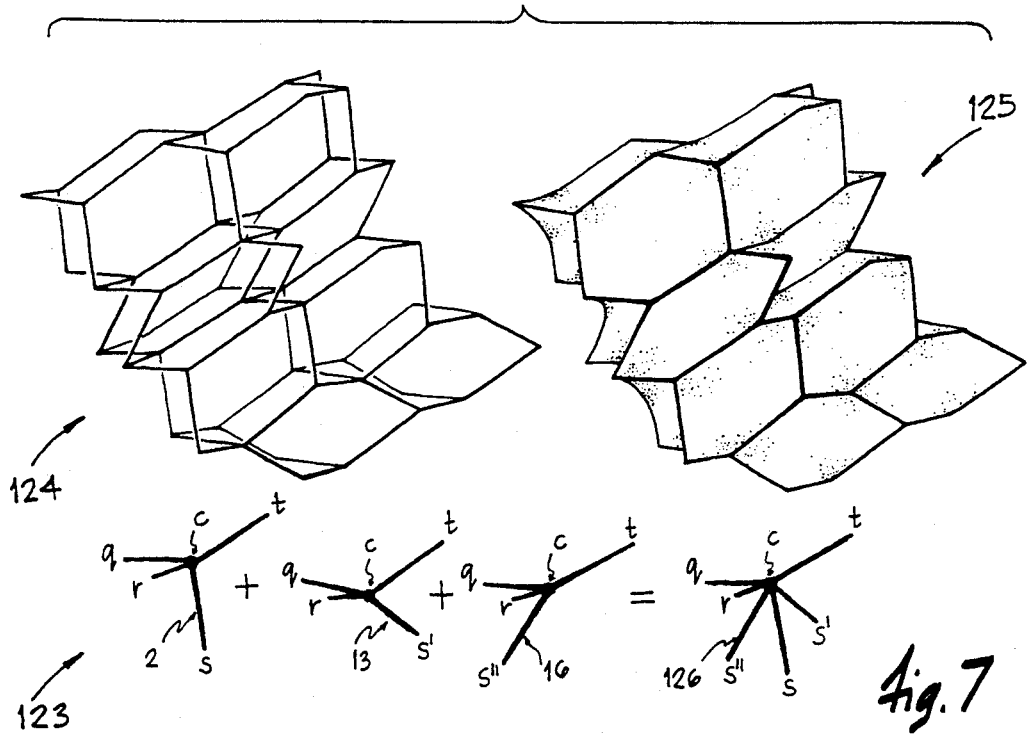
FIG. 7 shows the method of deriving composite n-stars by adding stars with the example of an irregular, layered, non-periodic variant of the diamond lattice and the associated space-filling of saddle polyhedra.

FIG. 7 shows another example of a non-periodic lattice and space-filling for the n=6 case. This example, like some described in FIGS. 6a and 6b, is obtained by stacking a periodic layer with other layers in an periodic or non-periodic manner. When modules based on a different star are stacked, the lattice or space-filling has a composite value of n higher than the individual stars. The process of deriving composition n-stars is fundamental to deriving this class of layered non-periodic configurations and is shown in 123. Three related 4-stars, 2, 13 and 16 from FIG. 1, are added to obtain the star 126. The three stars have the vectors q, r and t in common, and the variant vectors s, s' and s" are added to obtain a 6-star as shown. Each individual layer of the lattice 124 is based on the individual stars, while the entire lattice is based on the composite star. Portions of only four layers are shown and the individual skeletal cells 5, 17, 14 and 5 (reading from top down) in each layer are shown. The associated space-fitting 125 is composed of corresponding saddle polyhedra 7, 33, 31 and 7. Compared with the sheared diamond lattice 35 or 37, this is an example of a non-periodic, irregular, layered diamond lattice.

Figure 8:
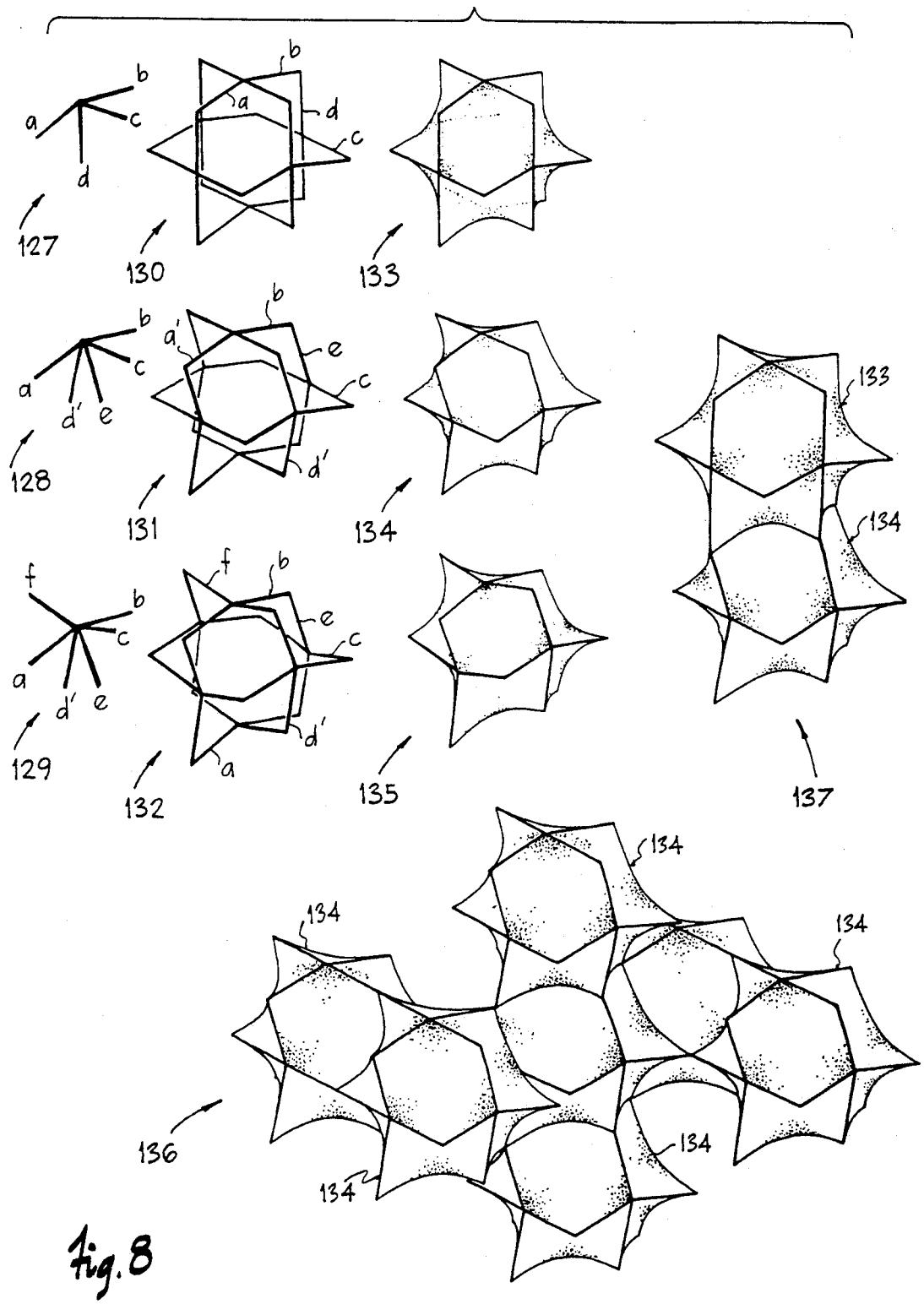
FIG. 8 shows an example of various saddle octahedra composed of eight hexagonal saddles from a star that changes n from 4 through 6. The corresponding space-fillings are also shown.

FIG. 8 shows an example of topologically identical saddle polyhedra and their space-fillings based on a transforming n-star where n increases from 4 to 6. It is different from the examples shown so far where topologically identical saddle polyhedra were obtained from the same n-star. The 4-star 127 is composed of four vectors a, b, c and d. A fifth vector e is added to transform it to the 5-star 128. In the example shown, d has been tilted to d'. A sixth vector f is added to transform it to the 6-star 129. Clearly, the process of adding new vectors could be continued to higher values of n. The associated skeletal frames 130-132 for each of the three stars are shown alongside and make the process of transformation clearer. For each, the corresponding saddle polyhedra 133-135 are shown alongside. These saddle polyhedra are saddle octahedra and are composed of eights saddle hexagons.

Each saddle octahedron fills space periodically by itself or in non-periodic layers when alternated with layers or rows of other saddle octahedra. The periodic space-filling 136 is composed of 105. The configuration 137 shows the stacking of 133 on top of 134. When converted into a space-filling, both 133 and 134 can be repeated in their own layers periodically and the layers can be stacked periodicaly or non-periodically. Similarly, 135 and other variant modules can be introduced.

FIG. 9 shows a portion of a non-periodic lattice 139 composed of inclined parallelopipeds. It is based on the 6-star 138 composed of six vectors g, h, i. j, k and l of arbitrary lengths and arbitrary angles between them. When the lengths of the vectors are equal, the parallelopipeds become rhombohedra. The parallelopipeds in 139 are so arranged that planar layers do not exist in this párticular example. All the parallelopipeds are tilted according the vector angles. Only eight parallelopipeds 142-149 of a space-filling lattice are shown in bold lines; the dotted lines extend the near faces (bolder lines) of the parallelopipeds. The edges of the parallelopipeds are marked by their corresponding vectors to which they are parallel and equal. The parallelopipeds or rhombohedra, obtained from p=3 stars, are the smallest zonohedral modules. The p=2 case makes a rhombus and no saddle structure is possible for p=2. For p=3, only one saddle zonohedron composed of three saddle hexagons, each obtained by removing one edge between three pairs of adjacent faces, is possible. The other examples are saddle polygons with six or either faces and are described next.

Configuration 141 is a portion of a non-periodic arrangement of saddle hexagons, where each saddle is bounded by the edges of one parallelopipeds. This is shown in 140 where an isolated saddle hexagon 149a is defined by six edges of the parallelopipeds 149. The edges are parallel to the vectors g, h and l. In 141, eight saddles 142a-149a are shown, each corresponding to the parallelopipeds in 139. The saddle 142a is defined by the parallelopipeds 142, 143a by 143, and so on.

FIG. 10 shows two more examples of saddle polygons inscribed within the parallelopipeds of 139. The configuration 151 is composed of rhombii 143b and 148b, and six octagonal saddles 142b, 144b-147b and 149b. A detail of 146b within the parallelopiped 146 is shown in 150. The configuration 153 is a curved variant of 151. Each octagonal saddle is converted into a saddle with curved edges as a shown in 152. The saddle 146b is transformed to 146c by converting each right-angled frame into a curved segment. Four curved segments define the boundary of 146b which is composed of alternating pairs of upward-facing curves 154 and downward-facing curves 155. 154 lies on the upper half of the face of the parallelopiped and 155 lies on the bottom half of the adjacent face. The plane view of 146c is a rhombus or a parallelogram, and is a skewed variant of the familiar hyperbolic paraboloid. Any suitable quadric or super-quadric curve could be used as a generator for this type of saddle surface. In 153, the saddles correspond to 151 in a one-to-one manner. The modules 143c and 148c are synclastic and doubly-curved in the same direction, and the remaining six modules are anti-clastic surfaces.

FIG. 11 shows a portion of a non-periodic space lattice 157 based on the 6-star 156 which is variant of the star 138. The six vectors directions are g, h, i, j, k' and l as before, with the difference that the vector k' is a shorter than k. The vectors associated with the edges of 157 are marked. In addition, six inclined parallelopiped cells 161-166, shown embedded in 157, are isolated in 158. The interior space between the six cells is a "hole". These six cells provide the framework for six saddle octagons 161a-166a in the configuration 160. 160 is a continuous surface with a hole 167a. The saddle octagons are the type 150 of FIG. 10. A detail of two adjacent saddles, 163a and 164a, is shown in 159. The edges are identified by their corresponding vectors, and the two share a common edge 168. The edge 168 can be seen on the bottom right between two edge-to-edge-connected parallelopiped cells 163 and 164. The edge-to-edge connection between two adjacent cells permits a smooth undulating surface between the two as seen in 159.

FIG. 12 is an extension of FIG. 11. The configuration 160 of FIG. 11 has been extended, and can be continued by adding extensions like 174-176 and by creating new holes like 173. The configuration 172 is an alternative obtained by introducing the stacking of modules on top of one another, i.e. saddles are defined by parallelopipeds or rhombohedra connected face-to-face. Two possible stackings are shown in 170 and 171. The top modules 177 are the same in each case, but the bottom modules are two different saddles 163a and 163b obtained from the same cell 163. 171 is "tubular" and is a continuous hollow surface. 172 is a portion of a non-periodic configuration with holes 178-80, with stackings of the types 170 and 171, and with smooth transitions of the type in 159.

FIG. 13 shows a one example of a saddle zonohedron with spherical or central symmetry based on a 10-star. The 10-star 181 is derived from the ten directions determined by the vectors xi-xx which join the center of a regular pentagonal dodecahedron to its vertices; the dodecahedron is a regular polyhedron composed of twelve pentagons and twenty vertices. The vectors corresponding to the edges are marked. The zonohedron 182, shown along its 5-fold axis of symmetry, has icosahedral symmetry and is composed of 90 rhombic faces. It consists of two types of rhombii, one comprising sixty rhombii grouped in twelve sets of five around the 5-fold vertices marked 183, and the other comprising thirty rhombii 184 located perpendicular to the 2-fold axes of symmetry and between two of the former sets. A saddle zonohedron 185 is obtained from 182 by converting the sets of five rhombii around the vertices 183 into twelve saddle decagons 186. In 185, three saddle decagons meet at the 3-fold vertices, and each pair of saddle decagons is separated by the rhombii 184 which remain unchanged. 187 is a different view of 185.

Other examples of saddle zonohedra from icosahedral symmetry include interesting cases from a 15-star, a 30-star, two different types of 60-stars, a 120-star and various combinations of these. From octahedral symmetry, the 13-star is an interesting generator for saddle zonohedra. The duals of semi-regular polyhedra retain the symmetry, but have different lengths of vectors. Non-convex polyhedra, like the uniform polyhedra or Kepler-Poinsot stellated polyhedra expand the geometry of stars. In addition, an infinite class can be derived from the various classes of geodesic spheres. Such spherical subdivisions, based on the sphere-projection of regular or semi-regular polyhedra followed by their subdivision, produce a large number of generator n-stars for saddle structures. From each, sub-stars can be obtained from all values of p greater than two and less than or equal to n. In all cases from symmetric stars, the derived saddle zonohedra may retain the symmetry, be partially symmetric or may be completely asymmetric. Further, combinations of convex, non-convex or plane parallelograms may be used as shown for examples based on 4-, 5- and 6-stars in FIGS. 1, 3 and 5, respectively. The possibilities increase by arbitrary stars. When the vectors are equal, the radiating vectors lie on a sphere. However, when the vectors are not equal, the polyhedron may be totally irregular or non-convex.

FIG. 14 shows two examples where the inclined parallelopiped (or a rhombohedron) is subdivided periodically into smaller parallelopipeds within which saddle polygons are introduced. 188 show five parallelopipeds from 151, where 142b is shown dotted and where each is subdivided into four smaller parallelopipeds 190. Each smaller parallelopiped contains a saddle octagon 191 of the type 150 of FIG. 10. In 189, a parallelopiped (shown in dotted) is converted into eight smaller parallelopipeds 192, each containing a saddle hexagon 193 of the type 140 of FIG. 9. These illustrations suggest the possibility of subdividing parallelopipeds or rhombohedra into smaller ones in a periodic manner, enabling the possibility of developing configurations which are periodic within the parallelopipeds but the parallelopipeds are arranged non-periodically. Such configurations are locally periodic but globally non-periodic. Alternatively, the subdivided parallelopipeds could be used in arrangements with an overall central symmetry.

FIG. 15 shows examples of integration of saddle surfaces with space frames. In building structures, saddle surfaces can be used as shells, either precast of cast-in-place, or as tensile surfaces. The tensile surfaces can be cable nets or membranes. The tensile surfaces can have free edges, or the edges can be constrained by a rigid frame. When used in combination with space frames, the membranes can be used a enclosing or space-defining surfaces, or as structural element which contributes to the stability of the frame. In the examples shown, the nodes of the space frame will have to be rigid in certain planes. When nodes are designed as free hinges, the well-known technique of triangulating the space frames could be used. This could be achieved by introducing diagonal braces of tensile cables as appropriate. The examples 194–200 show a selection of possibilities.

The structure 200 shows a tubular rigid frame 201 to which the edges of the saddle surface 146b is attached. The corners 202 are fixed and resist bending deformation. In contrast, the structure 195 shows the same saddle surface 146b held within a space frame configuration composed of struts 203 and nodes 204. The nodes permit rotation and diagonal struts 205 are introduced as stabilizers. In 196, the framing members 206 are connected to one another without visible nodes, but are free to move at the corners when subjected to forces. In this example, tension cables 207, anchored to fixed points 208, provide the needed stability. Only two saddle modules 196 and 197 are shown, and the dotted lines 209 indicate the positions of neighbouring modules. The fixed points 208, defined by the vertices of a portion of a non-periodic space lattice in this case, are thus determined by the vertices of adjacent parallelopipeds. This condition may be relaxed where other structurally favorable attachment points are available in the configuration.

The configuration 197 shows the structural framing of the six saddles 161a–166a from earlier configuration 160 in FIG. 11. The rigid frame of the type 194 is used in this example. The structure has five different levels which are marked by the points L0, L1, L2, L3 and L4. The level L0 is the "ground" level and marks a horizontal plane. L4 is the highest level of the structure. The vertical columns or posts marked B, B' and C are added to the configuration 160 to carry the weight to the level L0. These are continuations of the edge framing members. The columns B and B' mark the vertical direction. The columns B' are added to facilitate the transfer of weight from the inclined edges of the saddles.

The structures 198 and 199 show the use of tensile membrane surfaces with free edges within a space frame. The edges can use tensile cables to resist tear. The space frame is similar to 195 but no diagonal members are shown; rigid joints may be used instead of hinged nodes. In 198, the attachment points 210 of the membrane 211 are in the middle of the struts 203. In 199, the saddle 212 is of the type 140 of FIG. 9 but has free edges 213 separated from the struts 203 and is connected only at six nodes 204. The free edges can be converted into edge-cables to resist tension of the periphery of the membrane. In the structure 200, the non-periodic configuration 139 of FIG. 9 is converted to a space frame with struts 203 and nodes 204 and tensile membranes 142d and 144d–147d are inserted in five of the seven parallelopipeds. The other two, 143e and 149e, are shown without a membrane. The membranes are shown with free edges 213. The parallelopipeds correspond to the those in 139, and the configuration is a small portion of a space-filling structure.

What is claimed is:

1. A saddle zonohedral building system produced by the steps of:
   selecting at least one saddle zonohedron having edges parallel to p vectors derived from a plane-faced zonohedron based on a polyhedral n-star and composed of contiguous sets of parallelograms, but excluding plane-faced zonohedra composed only of even-sided regular polygons,
   and replacing at least one contiguous set of said parallelograms of each said plane-faced zonohedron with a saddle polygonal face to produce a saddle zonohedron, each parallelogram of said set of contiguous parallelograms sharing a common inner edge with another parallelogram of said set and the remaining edges of each parallelogram being outer edges which bound said saddle polygon,
   where p is any number greater than two and less than or equal to n,
   where the geometry of n vectors is determined by a polyhedral n-star obtained by joining the center of the polyhedron to its vertices, where said polyhedral n-star is selected from the group consisting of
      a polyhedral star based on any arbitrary or irregular polyhedron with unequal vectors, when n is greater than three, or
      a polyhedral star based on any arbitrary or irregular polyhedron with equal vectors, where n is greater than three, or
      a spherically symmetric star based on any spherically symmetric polyhedron with 2 n vertices, where n is any number greater than six, selected from a group comprising:
         any substantially regular polyhedron,
         any substantially semi-regular polyhedron or semi-regular dual polyhedron,
         any combination of regular and semi-regular polyhedral stars,
         any polyhedral star obtained by the surface subdivision of any spherically symmetric polyhedron.

2. A building system produced by the process of claim 1, wherein
   the said parallelograms obtained from said spherically symmetric stars are modified by changing the lengths of vectors but keeping the angles fixed.

3. A building system produced by the process of claim 1, wherein
   the replacing step is performed by removing the contiguous set of parallelograms and by replacing one or more of said remaining edges with a curved edge.

4. A saddle zonohedral building system produced by the process of claim 1, wherein
   the replacing step comprises the step of replacing contiguous sets of parallelograms with convex saddle polygons of one kind only.

5. A saddle zonohedral building system produced by the process of claim 1, wherein
   the selecting step comprises the step of selecting a plurality of zonohedrons having the characteristics described, and following said replacing step said method further includes the step of arranging said saddle zonohedra in a periodic array to produce said building.

6. A building system claim 1, wherein
   the plurality of said saddle zonohedra make up a non-periodic array.

7. A building system produced by the process of claim 1, wherein
   the plurality of said saddle zonohedra make up a special type of non-periodic array which is periodic in one direction and non-periodic in another.

8. A building system produced by the process of claim 1, wherein the plurality of said saddle zonohedra is composed of saddle tetrahedra which fill all space without gaps, wherein said saddle tetrahedra are composed of four saddle hexagons, wherein three said saddle hexagons meet at each of the four vertices of the said tetrahedron.

9. A building system according to claim 8, wherein more than one type of said saddle tetrahedron is used.

10. A building system produced by the process of claim 1, wherein the plurality of said saddle zonohedra is composed of saddle octahedra which fill all space without gaps, wherein said saddle octahedra are composed of eight saddle hexagons where four said saddle hexagons meet at each of the six vertices of the said octahedron.

11. A building system according to claim 10, wherein more than one type of said saddle octahedron is used.

12. A building system produced by the process of claim 1, wherein the plurality of said saddle zonohedra is composed of saddle truncated octahedra which fill all space without gaps, wherein said saddle truncated octahedron has twenty-four vertices and is composed of eight saddle hexagons and six parallelograms, where two hexagons and one parallelogram meet at every vertex and where the said saddle truncated octahedron is derived by removing twenty-four of the sixty edges of a rhombic triacontahedron.

13. A building system according to claim 12, wherein more than one type of said saddle truncated octahedron is used.

14. A building system according to claim 12, wherein said plurality of said saddle truncated octahedron define a continous infinite surface that divides space into two parts without self-intersections, wherein the said six parallelogram faces of the said saddle truncated octahedron are removed to produce a continuous space between adjacent saddle truncated octahedra.

15. A building system according to claim 12, wherein the said saddle truncated octahedra are connected to others through intermediate prisms linking two adjacent saddle truncated octahedra, and where said prisms are plane-faced or concave parallelopipeds.

16. A building system produced by the process of claim 1, wherein the said plane-faced zonohedron is a parallelopiped and the plurality of said parallelopipeds define a non-periodic lattice with n-directions, wherein the edges of the said parallelopipeds define the edges of a plurality of saddle polygons.

17. A building system according to claim 16, wherein the said saddle polygons defined by the edges of said parallelopipeds are saddle hexagons.

18. A building system according to claim 16, wherein the said saddle polygons defined by the edges of said parallelopipeds are saddle octagons.

19. A building system according to claim 16, wherein the said plurality of said saddle polygons are so arranged to make up finite sets of periodically arranged saddle polygons, and where the plurality of said sets are arranged non-periodically.

20. A building system produced by the process of claim 1, wherein the said saddle polygonal faces are designed as smooth surfaces.

21. A building system produced by the process of claim 1, wherein the structural system for the said saddle polygons comprises combination of saddle surfaces with space frames having hinged or semi-hinged notes.

22. A saddle zonohedral building system produced by the process of claim 1, wherein the replacing step comprises the step of replacing contiguous sets of parallelograms with convex saddle polygons of more than one kind.

23. A saddle zonohedral building system produced by the process of claim 1, wherein the replacing step comprises the step of replacing contiguous sets of parallelograms with non-convex saddle polygons of one kind only.

24. A saddle zonohedral building system produced by the process of claim 1, wherein the replacing step comprises the step of replacing contiguous sets of parallelograms with non-convex saddle polygons with other non-convex saddle polygons.

25. A saddle zonohedral building system produced by the process of claim 1, wherein the replacing step comprises the step replacing contiguous sets of parallelograms with combination of convex and non-convex saddle polygons.

26. A saddle zonohedral building system produced by the process of claim 1, wherein the replacing step comprises the step replacing contiguous sets of parallelograms with combination of saddle polygons with parallelograms.

27. A building system produced by the process of claim 1, wherein the said saddle polygonal faces are designed facetted surfaces composed of plane polygons.

28. A building system produced by the process of claim 1, wherein the structural system for the said saddle polygons comprises a combination of saddle surfaces with rigid frames.

29. A building system produced by the process of claim 1, wherein the structural system for the said saddle polygons comprises the use of saddle surfaces as tensile membranes.

30. A building system produced by the process of claim 1, wherein the structural system for the said saddle polygons comprises the use of saddle surfaces as tensile cable nets.

31. A building system produced by the process of claim 1, wherein the structural system for the said saddle polygons comprises the use of saddle surfaces as rigid or semi-rigid shell-like structures.

32. A building system produced by the process of claim 1, wherein the structural system for the said saddle polygons comprises the use of saddle tensile surfaces with free edges in tension.

33. A building system produced by the process of claim 1, wherein the structural system for the said saddle polygons comprises the use of saddle tensile surfaces with edges embedded in the framing members.

* * * * *